United States Patent [19]

Krupka

[11] 4,074,479
[45] Feb. 21, 1978

[54] LAWN EDGING

[76] Inventor: Richard W. Krupka, 2747 Donegal Road, Racine, Wis. 53405

[21] Appl. No.: 790,364

[22] Filed: Apr. 25, 1977

[51] Int. Cl.² ......................... A01G 1/00; E01C 11/22
[52] U.S. Cl. .......................................... 52/102; 47/33; 404/7
[58] Field of Search ................. 52/287, 288, 102, 716, 52/718, 278, 11; 47/33; 256/19; 404/7

[56] References Cited

U.S. PATENT DOCUMENTS

| | | | |
|---|---|---|---|
| 2,620,525 | 12/1952 | Ketchum | 52/287 X |
| 3,201,212 | 8/1965 | Zaremski | 52/716 X |
| 3,405,488 | 10/1968 | Nelson | 52/716 |
| 3,520,082 | 7/1970 | Smith | 52/102 X |
| 3,762,113 | 10/1973 | O'Mullan et al. | 47/33 X |
| 3,861,110 | 1/1975 | Bartlett | 52/718 |

FOREIGN PATENT DOCUMENTS

| | | | |
|---|---|---|---|
| 1,464,843 | 1/1967 | France | 404/7 |
| 2,337,164 | 2/1975 | Germany | 404/7 |

Primary Examiner—J. Karl Bell
Attorney, Agent, or Firm—Wheeler, Morsell, House & Fuller

[57] ABSTRACT

An open bottomed trapezoidal box having horizontally outwardly extending flanges at the free edges is provided at intervals with clips which join the horizontal flanges and which join successive lengths of the linear open box sections. The linear sections may be straight, curved on one or more radii, or angular, for flexibility in forming any outline. Alternate embodiments of the clip are shown. The clip may be used in straight lengths whether the sections are curved, angular, or straight.

8 Claims, 3 Drawing Figures

LAWN EDGING

BACKGROUND OF THE INVENTION

Many forms of lawn edging are known, including at least the following U.S. Pat. Nos.: 3,277,606, 3,762,113, 3,281,988, 3,520,082, 2,821,809, 3,484,989, 3,515,373, 1,979,979, 2,713,751, 3,314,193, 3,745,701, 3,916,563, 3,378,949, 3,724,128, 3,373,668, 3,777,421. Of the U.S. Pat. Nos. listed, probably the closest are 3,762,113, 3,277,606, and 3,520,082. In no case in the known patents are there outwardly extending horizontal flanges, or clips connecting such flanges and in no case is the shape trapezoidal as in my invention.

SUMMARY OF THE INVENTION

My invention consists of linear edging sections having open bottoms and more or less flat tops. The trapezoidal shape is extremely strong as an arch while minimizing a tendency to spread laterally under a vertical load present in prior art vertical sided or multiple angle sided units. To the extent that there is a tendency to spread laterally, my clips on the horizontal flanges control that tendency, giving further rigidity to the arch form. The clips further serve to connect successive linear sections, making separate devices for that purpose unnecessary. The clips themselves, of either embodiment, have a marginal channel to contain the flange of the arch and also have an inner shoulder opposed to the inner edge of the flange of the linear section so that the entire flange is securely captured within the clip.

The lawn edging of my invention is very easy to install. It may be laid out in position and used as a guide for a trench in which the edging is laid by placing the linear sections end to end, connecting the ends with clips which are also placed in a few intermediate locations. The trench is then backfilled, providing a neat horizontal surface separating adjacent areas. The depth of the linear box section is sufficient to prevent the growth of grass beneath the edging. The trapezoidal shape keeps the edging from moving vertically upward and the flanges and clips keep it from working downward, so that it is extremely stable in position. It offers no upward projection which a lawn mower may catch and destroy and is sufficiently strong and broad so that the mower can cut all of the grass without a separate edging operation in most cases. The form of the device is such that a few basic forms serve all needs. For instance, a corner section may be used either as an inside corner or as an outside corner. A curved piece may be laid to curve in either lateral direction. There are no separate heads or bores which interfere with good alignment. The clips are of such a nature as to permit them to be formed by casting, extrusion, or vacuum forming, as are the linear sections. It presently appears that vacuum forming will be the preferable method.

DRAWINGS

DETAILED DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Figure 1:
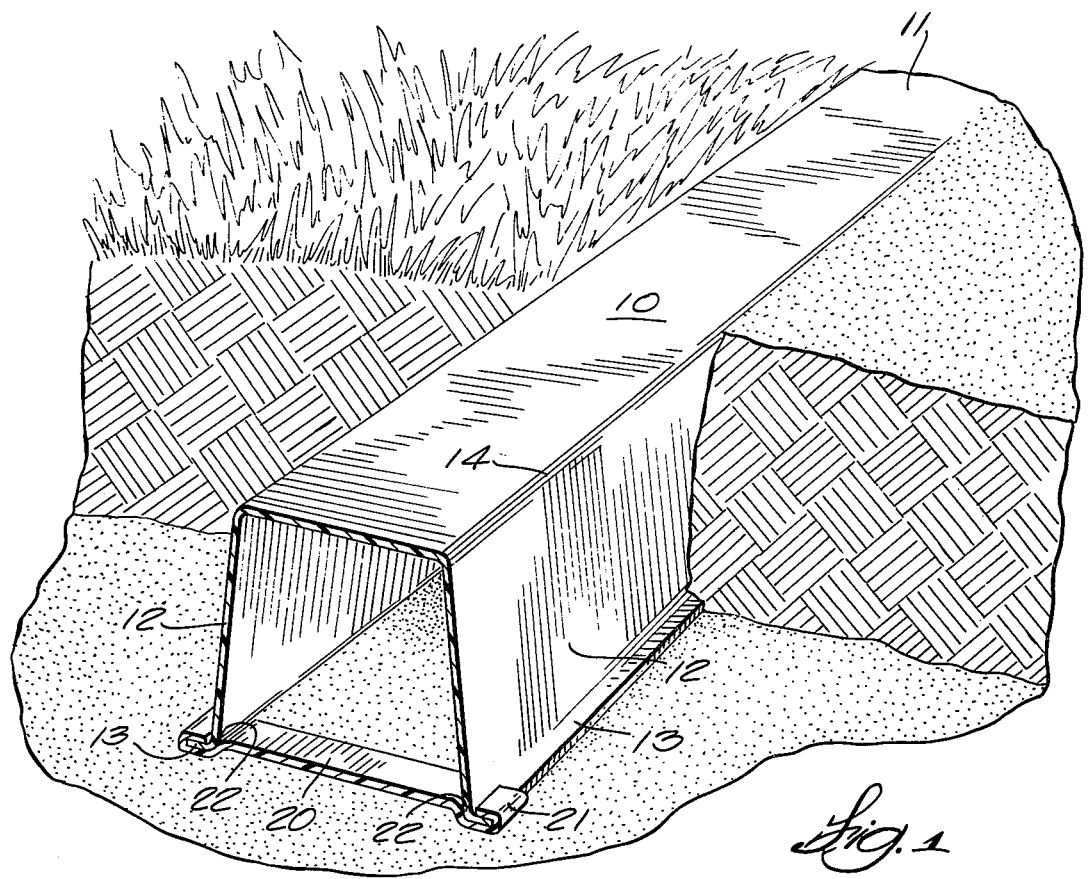
FIG. 1 is a view partly in vertical cross-section and partly in perspective showing the lawn edging of my invention installed.
Figure 2:
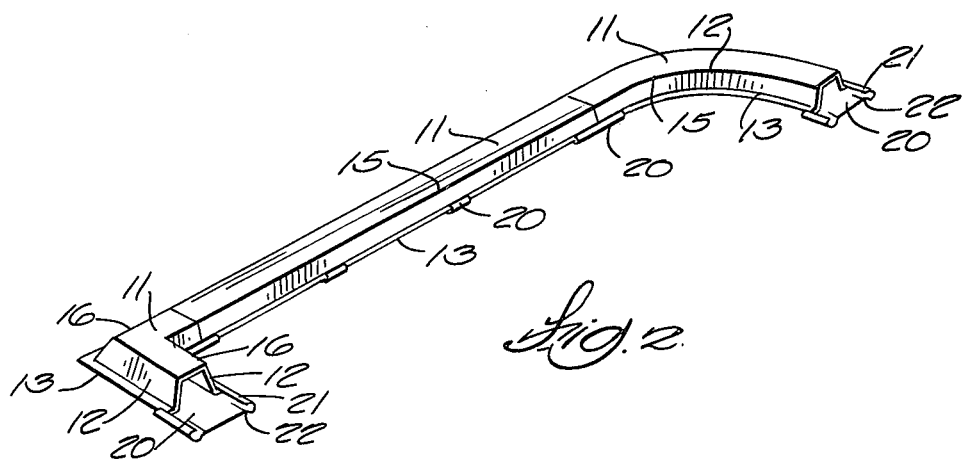
FIG. 2 is a perspective view of an array of lawn edging showing a variety of pieces assembled to form a border.

As shown in FIGS. 1 and 2 my device consists of linear lawn edging sections 10 having a flat upper surface 11 and a slightly inclined side surface 12 to form the upper three sides of an isosceles trapezoid resting on its base. The lower free margins of the slightly inclined vertical sides consist of horizontally extending flanges 13.

As best shown in FIG. 2 these linear sections may be made with straight edges 14 joining surfaces 11 and 12 or they may have curved edges 15, or the edges may be angles 16. In each side with the side walls extending downwardly at complementary angles to the flanges 13 at the free edges.

Clips 20 are provided with a channel section 21 at each end and with an upwardly extending shoulder 22 spaced inwardly from the channel sufficiently to engage the inner edge of the flange 13 of the linear lawn edging sections 10. The clip 20 may be relatively short along the long dimension of the lawn edging box 10, although for joining sections of lawn edging it is preferable that the clip have a somewhat longer axial dimension, as best shown in FIG. 2. In any case a straight clip may be used regardless of the shape of edges 14, 15 or 16.

Figure 3:
FIG. 3 is a modified clip shown in vertical cross-section.

As best shown in FIG. 3, if desired the clip 201 may be made with a flat bottom, in which case the shoulders take the form of vertical ribs to engage the inner edges of flanges 13.

I claim:

1. A lawn edging comprising linear box sections having a top wall and two side walls wherein the novelty comprises side walls that are straight in lateral cross-section and inclined between about 10° and 30° to a vertical plane to form an isosceles trapezoid with said top wall and an underlying surface, outwardly directed flanges at the bottom of each side wall, and a plurality of clips, each said clip having an inwardly directed channel at each end to receive a said outwardly directed flange and an outwardly directed abutment engageable with the inner margin of the flange to retain the flange in the channel.

2. The device of claim 1 wherein the abutment is a flange projecting from the surface of the clip.

3. The device of claim 1 wherein the clip has a generally flat bottom surface connecting the flanges, and is very limited in length in a direction along the edging.

4. The device of claim 3 wherein said abutment is an offset in said generally flat bottom surface.

5. The device of claim 1 wherein said top wall is joined to said side walls by a straight edge.

6. The device of claim 1 where said top wall is joined to said side walls by a curved edge.

7. The device of claim 1 wherein said top wall is joined to said side walls by an angular edge.

8. The device of claim 1 wherein the clip has a generally flat bottom surface connecting the flanges, and is very limited in length in a direction along the edging, and said abutment is an offset in said generally flat bottom surface and said top wall is connected to each of said side walls along a linear edge.

* * * * *